United States Patent [19]

Blaimschein

[11] Patent Number: 5,457,868
[45] Date of Patent: Oct. 17, 1995

[54] WORK SUPPORTING METHOD USING A DECK FOR USE IN MACHINE TOOLS, PARTICULARLY IN CUTTING MACHINES

[75] Inventor: Gottfried Blaimschein, Steyr, Austria

[73] Assignee: GFM Gesellschaft für Fertigungstechnik und Maschinenbau Aktiengesellschaft, Steyr, Austria

[21] Appl. No.: 254,318

[22] Filed: Jun. 6, 1994

Related U.S. Application Data

[63] Continuation-in-part of Ser. No. 81,513, Jun. 15, 1993, Pat. No. 5,372,357, which is a continuation-in-part of Ser. No. 855,209, Mar. 20, 1992, abandoned.

[30] Foreign Application Priority Data

Mar. 26, 1991 [EP] European Pat. Off. .............. 91890059

[51] Int. Cl.[6] ................................................... B25B 11/00
[52] U.S. Cl. ........................... 29/559; 269/21; 269/266
[58] Field of Search ............................. 269/21, 71, 76, 269/75, 266; 279/3; 294/64.1; 51/235; 29/559

[56] References Cited

U.S. PATENT DOCUMENTS

| | | |
|---|---|---|
| 2,729,040 | 1/1956 | Wallace et al. . |
| 3,108,791 | 10/1963 | Budney et al. . |
| 3,821,867 | 7/1974 | Hunkeler et al. . |
| 3,838,865 | 10/1974 | Roberts et al. ............................. 269/21 |
| 3,969,004 | 7/1976 | Schliemann ............................... 269/21 |
| 4,034,517 | 7/1977 | Weatherell et al. . |
| 4,066,249 | 1/1978 | Huber et al. . |
| 4,075,753 | 2/1978 | Gusching et al. ......................... 269/56 |
| 4,088,312 | 5/1978 | Frosch et al. ............................. 269/266 |
| 4,200,271 | 4/1980 | August et al. . |
| 4,200,272 | 4/1980 | Godding ................................... 269/266 |
| 4,491,306 | 1/1985 | Eickhorst ................................... 269/21 |
| 4,684,113 | 8/1987 | Douglas et al. . |
| 4,684,113 | 8/1987 | Douglas et al. . |
| 4,723,766 | 2/1988 | Beeding . |
| 4,924,258 | 5/1990 | Tsutsui ..................................... 269/21 |
| 4,946,149 | 8/1990 | Greene ..................................... 269/21 |

FOREIGN PATENT DOCUMENTS

| | | |
|---|---|---|
| 0069230 | 1/1983 | European Pat. Off. . |
| 0069230 | 7/1987 | European Pat. Off. . |
| 0505668 | 9/1992 | European Pat. Off. . |
| 62-130144 | 6/1987 | Japan ....................................... 269/21 |
| 2205258 | 12/1988 | United Kingdom ...................... 269/21 |

*Primary Examiner*—Robert C. Watson
*Attorney, Agent, or Firm*—Collard & Roe

[57] ABSTRACT

A method and apparatus for supporting and retaining a workpiece on a work-supporting deck for machining. The work-supporting deck includes vacuum aspirators each having a lifting ram formed with an axial suction bore and a suction cup carried on top of the lifting ram and communicating with the suction bore. An actuator is connected to each lifting ram and individually operable to move the associated lifting ram along a vertical axis. A clamping device releasably clamps onto each of the lifting rams. The actuator moves the clamped clamping device and lifting ram along a displacement path parallel to the vertical or any other axis.

15 Claims, 9 Drawing Sheets

WORK SUPPORTING METHOD USING A DECK FOR USE IN MACHINE TOOLS, PARTICULARLY IN CUTTING MACHINES

This is a continuation-in-part of my application Ser. No. 08/081,513, filed on Jun. 15, 1993, now U.S. Pat. No. 5,372,357 which in turn is a continuation-in-part of Ser. No. 07/855,209, filed Mar. 20, 1992, and now abandoned.

BACKGROUND OF THE INVENTION

1. Field of the Invention

The present invention relates to a work-supporting deck for use with machine tools, particularly cutting machines for cutting flat stock. The deck comprises a large number of vacuum aspirators that have lifting rams supporting suction cups, which serve to support and retain a workpiece. The lifting rams are vertically displaceable by actuators and may be fixed in position by a clamping device.

2. The Prior Art

Work-supporting decks having a work-supporting surface, at which a vacuum can be applied, have proved satisfactory for use in the processing of flat stock, such as the trimming or contour milling of metal plates and parts of wood, and particularly of monolayer plastic blanks or multilayer plastic blanks (composites). The two-dimensional workpieces can reliably be retained on the work-supporting surface by the applied vacuum substantially independently of their geometric configuration. But in order to avoid damage to such so-called vacuum decks, they must be provided with cover plates which support the workpieces and consist of an air-permeable material or of contour templates provided with suitable gaskets. But contour templates involve a substantial expenditure and must conform to specific workpieces so that their use is restricted. The porous cover plates of foamed plastic also are not satisfactory because furrows will be cut into the cover plate as it is penetrated by the tool during its processing operation and such furrows will adversely affect the application and action of the required vacuum. For this reason it is necessary to use a tool which laterally protrudes over the workpiece to the smallest extent possible and to cover the workpiece at its edges with plastic films so that the utilization of the tool is decreased and the films must be handled in a complicated manner.

In EP-8 0069 230 it has already been suggested to provide a work-supporting deck with several vacuum aspirators and to support the workpieces only by the suction cups of said aspirators rather than on a continuous work-supporting surface. But the workpiece cannot be retained as desired by the known vacuum aspirators unless they engage the workpiece at predetermined points so that each aspirator must individually be laterally adjusted and the work-supporting decks provided with said aspirators can be used only to support workpieces having a predetermined shape. Besides, the workpiece is supported only at a few points so that the processing of the workpiece gives rise to vibration, which often preclude the use of mechanical means for additionally fixing the workpiece.

An attempt to overcome certain of these drawbacks has resulted in work-supporting decks with adjustable vacuum aspirators for cutting spatially preshaped, thin-walled workpieces, or workpieces having a curved surface. These vacuum aspirators can be adapted to the particular workpieces on account of their vertically adjustable lifting rams, and the elastic properties of the aspirator material or of an articulated support of the suction cups. These decks are capable of holding workpieces with a complicated and delicate shape with the strength and stability sufficient for processing the workpiece effectively.

As shown by U.S. Pat. No. 4,684,113, it is known to drive the individual lifting rams by computer-control up into the particular nominal position in accordance with the surface of the workpiece, and to fix them in the nominal position via a clamping device. This, however, requires a positionable actuator for each vacuum aspirator and consequently leads to high construction and control expenditures.

According to GB-A 22 05 258, it has also already been proposed to use a tool-driving unit associated with the work-supporting deck for positioning the vacuum aspirators. The tool-driving unit is equipped with a workpiece spindle or the like that can be controlled in the z-direction and can preset the exact vertical position for the particular vacuum aspirator. For positioning the vacuum aspirators, only the workpiece spindle needs to be raised above the particular aspirator to the corresponding nominal level. The lifting ram of the vacuum aspirator is then driven up to the adjusted workpiece spindle until reaching the stop, so that said vacuum aspirators can be adjusted without costly positionable actuators and fixed in the adjusted position with a suitable clamping device. However, placing a workpiece on a large number of positioned vacuum aspirators posed considerable problems heretofore because when the workpiece is placed on the suction cups, the individual suction cups first have to be swivelled into the angular position that is correct for properly attaching them to the surface of the workpiece. This, however, is frequently not successfully accomplished because the suction cups attach themselves by suction too quickly to the surface of the workpiece, resulting in a faulty support. If the additional expenditure of individual connections of the vacuum aspirators with a vacuum source is avoided and the vacuum aspirators are automatically connected with a vacuum source, usually simultaneously with the raising into their nominal positions, there is consequently the risk that the workpiece is supported without the desired exactness, and the cutting of easily deformable, thin-walled workpieces is not feasible at all.

Furthermore, a work-supporting deck is known from EP-A 0 505 668, where the vacuum aspirators can be raised individually and in two performance stages. Therefore, it is possible in this case to first raise a few of the aspirators into their final positions, for example, the aspirators disposed in the marginal zone of the workpieces, as support points for a workpiece to be treated, and to then place the workpiece on these fixed support points. A few aspirators can still correctly attach themselves to the workpiece and fasten themselves on the latter by suction. Thereafter, all the other aspirators that are to be attached to the inner zone of the workpiece, are raised until they come to rest against the already positioned workpiece and perform their support function. In this connection, the vacuum aspirators rising to attach on the workpiece are forced up with a lower force in order not to impair the positioning support of the workpieces when they attach themselves. However, such later attachment of the majority of aspirators requires a sufficiently rigid workpiece, which through its dimensional stability jointly determines also the nominal positions of the aspirators. These work-supporting decks are unsuitable for delicate workpieces with a flexible soft surface.

Therefore, the invention based on the problem of eliminating such drawbacks and to create a work-supporting deck of the type specified above that assures in a relatively simple way and with low expenditure a flawless and careful supporting and cutting of any type of workpiece, including delicate workpieces.

SUMMARY OF THE INVENTION

It is the purpose of the present invention to eliminate these disadvantages and to provide a work-supporting deck which effectively retains the workpieces regardless of its shape and also establishes-optimum conditions for processing with a desired quality and for full utilization of the tools.

That object is accomplished in accordance with the invention by a multiplicity of vacuum aspirators which are arranged in rows and columns and are connected each to an individually operable actuator for moving the suction cup between in inactive lower position and an active upper position. Because the work-supporting surface is constituted by a multiplicity of aspirators, which are arranged in rows and columns, the workpiece will effectively be supported by the aspirators throughout its surface rather than only at discrete points so that the workpiece will reliably be retained as desired. Because each suction cup can independently be raised, the elevations of the points at which the workpiece is supported can be adapted to workpieces of any shape because it will be sufficient to raise and activate in accordance with a suitable control program only those of the existing suction cups which are disposed within the contour of a given workpiece. Any given workpiece, regardless of its geometric configuration, will snugly rest on the suction cups and will be retained by the raised suction cups whereas a marginal portion of the workpiece will be left free for processing. Any suction cup which partly underlies and partly protrudes laterally from the workpiece will not be raised and activated so that the processing tools can operate satisfactorily and can be optimally utilized. The application of the vacuum to the workpiece will not be adversely affected by the operation of the tool. The provision of the multiplicity of aspirators precludes vibration of the workpiece by the processing and ensures that the workpiece will be satisfactorily retained without the need for additional means, such as intermediate plates and covering films.

If the aspirators are arranged in groups which differ in pitch, it will be possible to provide different work-supporting regions for supporting different workpieces. For instance, relatively small workpieces may be supported in regions in which the aspirators are more closely spaced apart, and aspirators may be arranged in specially designed arrays for retaining certain workpieces.

The work-supporting surface of the work-supporting deck is desirably divided into at least two sections and the aspirators in each of the sections may be connected to a common vacuum source. Each section can then be used for solely supporting the workpiece for a performance of different operations. For instance, a workpiece may be processed while it is supported in one section and a different workpiece may be applied to or removed from the other section at the same time. Because the suction cups of each section are connected to a common vacuum source, it will be sufficient to apply a vacuum only to the suction cups of that section on which a workpiece is to be retained at a time so that the economy of the operation will be improved. It will be understood that aspirators of the two sections may be connected in alternation to one and the same vacuum source if it is sufficient to apply a vacuum only to one of the sections at a time.

In a desirable design, each aspirator comprises a lifting ram, which is formed with an axial suction bore and which at its top carries the suction cup. The lifting ram is operatively connected to an actuator and is vertically or in any other direction slidably fitted in a bushing, which is contained in a vacuum chamber. The lifting ram is formed with a transverse port bore, which is adapted to communicate with a transverse bore of the bushing as in a sliding valve. Such a lifting ram can be adjusted in a simple manner by the associated actuator, which preferably consists of a piston-cylinder unit, and by its displacement does not only impart to the suction cup the desired adjustment in height but also connects the suction cup to the vacuum chamber, to which a vacuum is constantly applied. As soon as the lifting ram has been raised to the position in which the port bore communicates with the transverse bore of the bushing, the suction cup automatically communicates through the suction bore with the vacuum chamber and the vacuum maintained in the vacuum chamber is applied by the suction cup to the workpiece.

Each lifting ram may be equipped with a clamping device supported within a displacement path in the direction of adjustment of the lifting rams, and movable back and forth between the ends of the displacement path by an actuator device. The slidingly adjustable clamping devices permit the vacuum aspirators to be displaced from a preset vertical position by an exactly defined distance so that the vacuum aspirators can be brought from a set waiting position, into an exactly predeterminable working position, which permits a rational and also careful and easy cutting of all sorts of different workpieces.

Each clamping device may be provided with its own actuator device for lifting the clamping devices; however, it is more useful if each actuator device consists of the actuator of the associated lifting ram and a return spring acting in the opposite direction of the actuator. Depending on whether or not the clamping device fixedly clamps the lifting ram, the lifting ram can be moved alone as against the clamping device, or together with the latter by an actuation of the associated actuator, which assures both the vertical adjustment of the lifting ram and the vertical motion of the clamping device. Optionally, a vacuum source valve is attached to each lifting ram for connecting a vacuum source to the transverse port bore. Each vacuum source valve may be operated by an individual control device or operated via the corresponding clamping device.

The work-supporting deck according to the invention permits particularly advantageous methods of holding a workpiece to be carried out. For this purpose, first a few, preferably three of the vacuum aspirators are raised into their working positions as workpiece supports, and locked there. The remaining vacuum aspirators, intended to hold the workpiece, are raised into waiting positions that are lower than their working positions by the length of the displacement path. The vacuum aspirators are locked in their waiting positions at the lower ends of the displacement paths. The workpiece is placed on the three raised aspirators and the remaining aspirators are raised from the waiting position to the working position.

Alternatively, all vacuum aspirators intended to hold the workpiece are first raised into waiting positions, that are lower than their working positions by the length of the displacement path, and locked there. A few, preferably three of said vacuum aspirators are then raised as workpiece supports from the waiting positions into their working positions by moving the clamping devices up, whereupon the workpiece is placed on the vacuum aspirators forming the workpiece support, and the remaining vacuum aspirators are then driven from the waiting positions into their working positions by moving the clamping devices up to the upper final points of the paths of displacement.

Therefore, first, only as many vacuum aspirators are raised as workpiece supports as are required for a safe and flawless support of the workpiece, i.e. three. However, two or four or more can be used as workpiece support depending on the shape of the workpiece. The workpiece to be chucked is placed and properly fixed in its position on these vacuum aspirators that have been raised into their working positions, whereby no attachment flaws have to be feared due to the low number of said vacuum aspirators, to which vacuum has already been admitted. The vacuum aspirators required for chucking the workpiece, if necessary with the exception of the aspirators raised as workpiece supports, are driven into a waiting position before the workpiece is put in place. The waiting position is predetermined by a corresponding adjustment. Such adjustment can be carried out, for example by a computer-controlled tool spindle, by a workpiece template, but also manually with a measuring stop or the like. The waiting position, the lifting rams of the vacuum aspirators are fixed with the clamping devices. Now, when the clamping devices of said vacuum aspirators are raised after the workpiece has been put in place, the vacuum aspirators move up by exactly the predetermined length of the path of displacement as well, and their suction cups then assume exactly the nominal position adapted to the surface of the workpiece. The suction cups of the vacuum aspirators attach themselves to the surface of the workpiece in the correct positions, so that a flawless and careful holding of the workpiece is assured.

Figure 2:
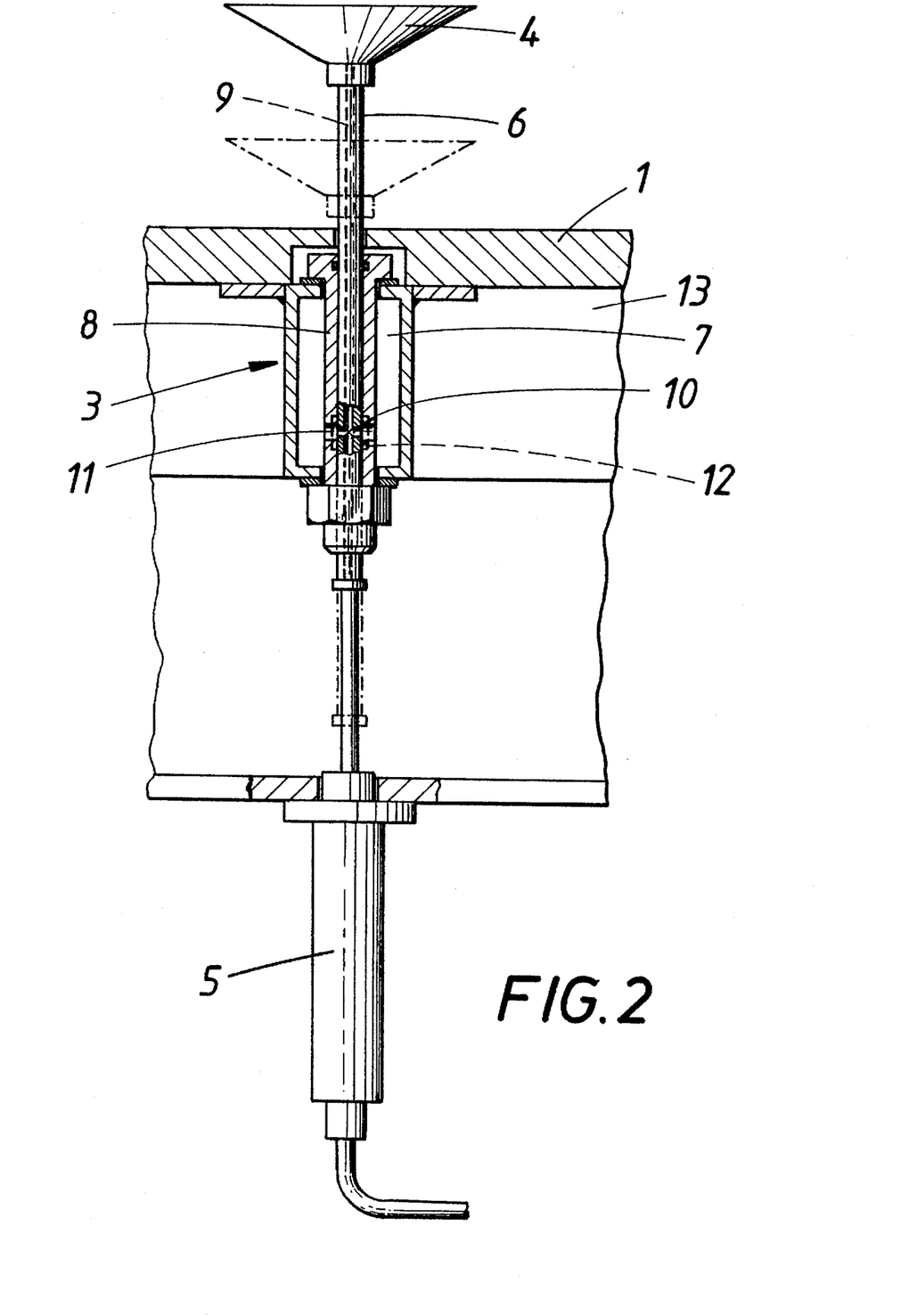
FIG. 2 is an enlarged vertical sectional view showing a vacuum aspirator of that work-supporting deck.
Figure 8:
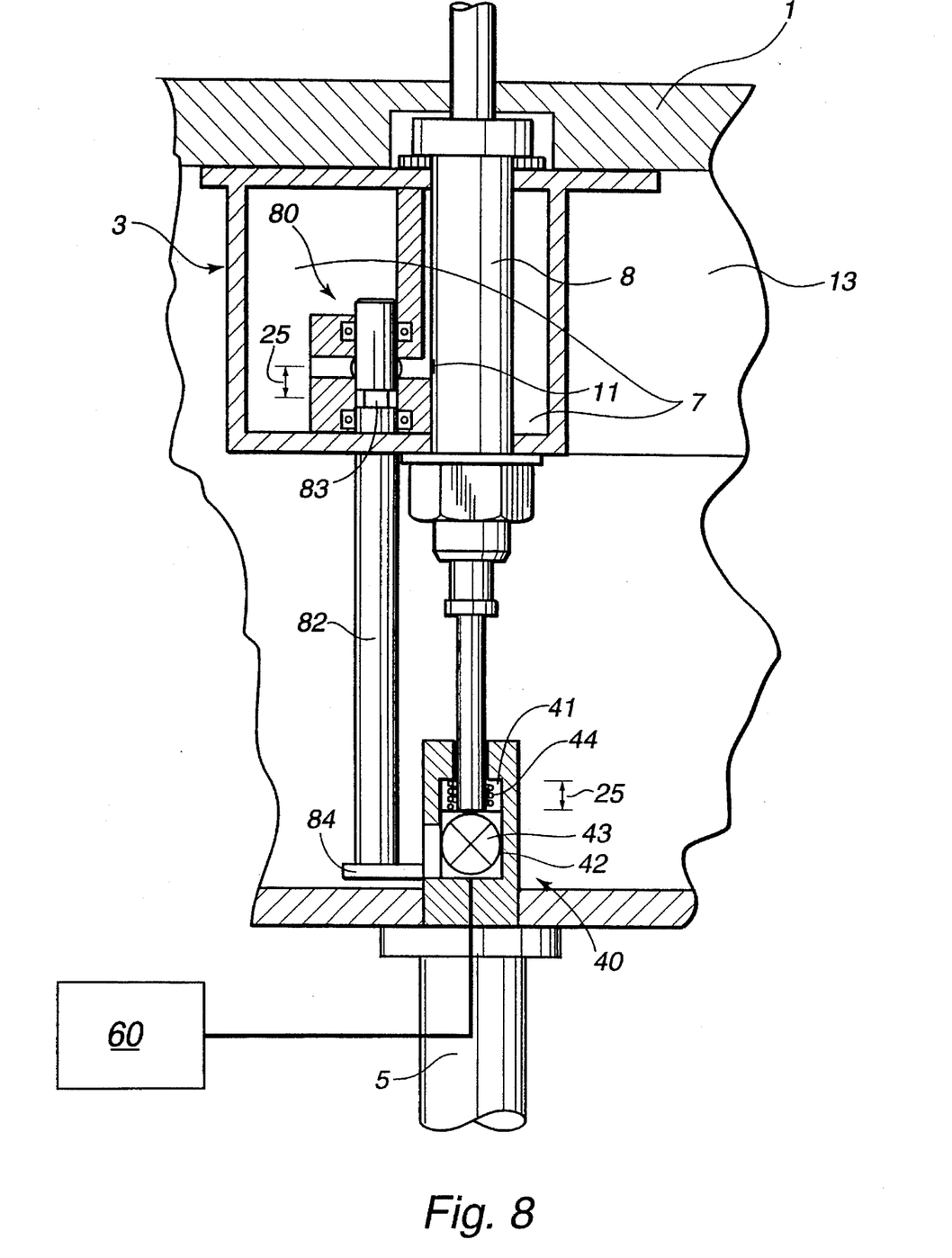
FIG. 8 is an enlarged side elevational view of a clamping device coupled to a vacuum source value.

Since provision is made for one common vacuum source for all vacuum aspirators with most work-supporting decks, the vacuum source could fail when a large number of aspirators are connected simultaneously. This might endanger the positioning support of the workpiece by the vacuum aspirators forming the workpiece support, which are connected to the same vacuum source. Therefore, to prevent this, the vacuum aspirators of FIG. 2 are driven from the lowest position to the waiting position, where bore 10 is connected via bore 11 or groove 12 to the vacuum source, in groups. The vacuum aspirators of FIG. 8 are driven from the waiting positions into the working positions, where the aspirators are connected via the clamping devices to the vacuum source, in groups as well, and no overstressing of the vacuum source has to be feared. Vacuum aspirators equipped with vacuum source valves may be connected to the vacuum source in groups via their individual controls independent of their position.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawing, wherein similar reference characters denote similar elements throughout the several views.

DETAILED DESCRIPTION OF PREFERRED EMBODIMENTS

Embodiments of the invention will now be described by way of example with reference to the drawing.

Figure 1:
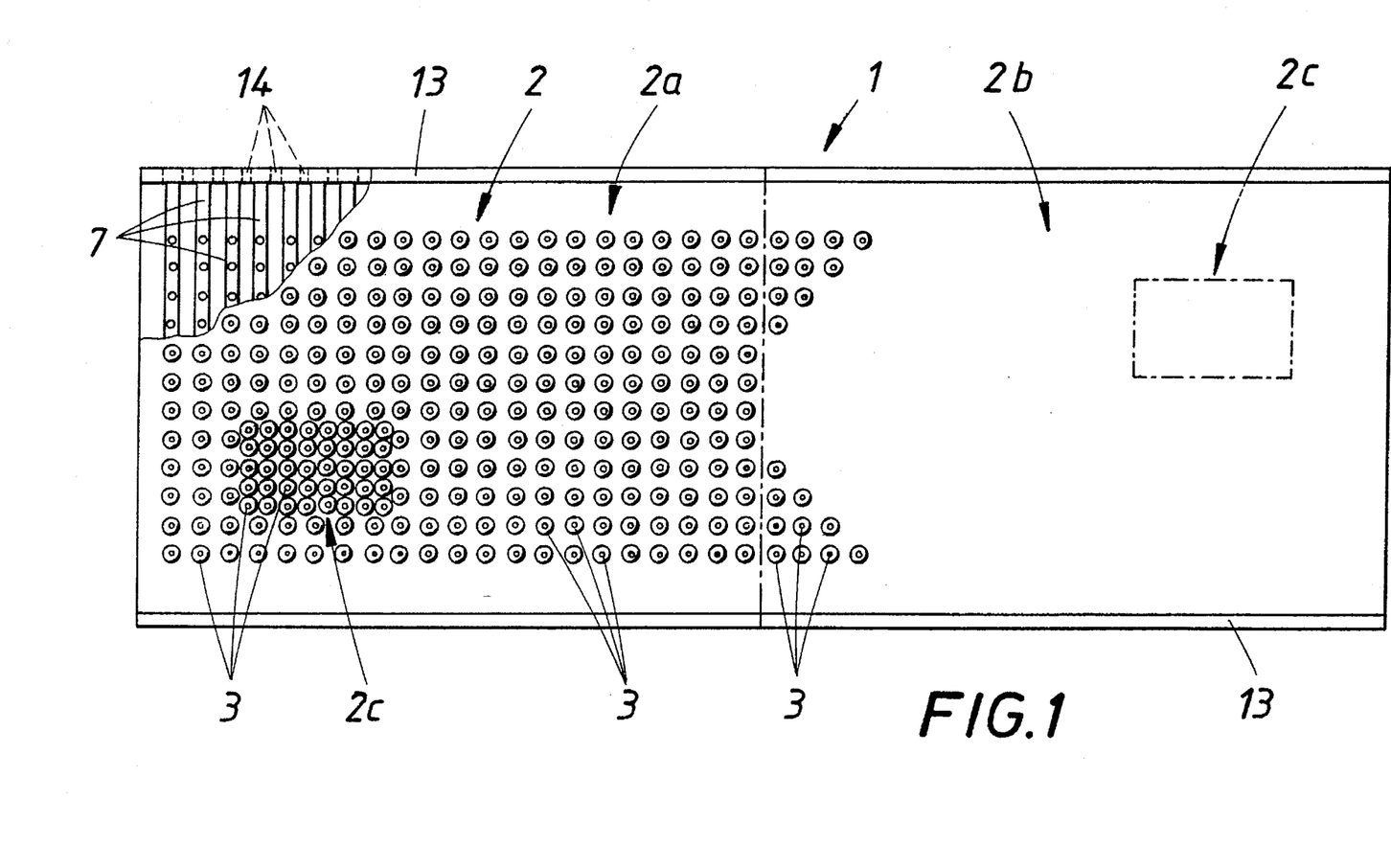
FIG. 1 is a schematic top plan view showing a work-supporting deck in accordance with the invention.

Flat stock to be processed, e.g., to be machined at its edges by contour milling, should reliably be retained in position regardless of its shape and size. For that purpose a work-supporting deck 1, as can be seen in FIG. 1, is provided, which has a work-supporting surface 2 consisting of a multiplicity of vacuum aspirators 3, which are arranged in rows and columns. As can be seen in FIG. 2, each vacuum aspirator 3 comprises a vacuum cup 4, which is adapted to be raised and lowered by means of an individually operable actuator consisting of a piston-cylinder unit 5 between a lower inactive position, in which no vacuum is applied, and an active upper position, in which a vacuum is applied. For that purpose each vacuum aspirator 3 comprises a lifting ram 6, which at its top carries the suction cup 4 and is connected to the actuator 5 and is vertically slidably fitted in a bushing 8, which extends in a vacuum chamber 7.

The lifting ram 6 is formed with an axial suction bore 9 and with a transverse port bore 10, which opens into the axial bore 9. Bushing 8 is formed with a transverse bore 11, which is adapted to register with the port bore 10 so that the suction bore 9 will communicate with the vacuum chamber 7 via the port bore 10 and the transverse bore 11 or will be shut off from the vacuum chamber 7 in dependence on the elevation of the lifting ram 6. The position of the port bore 10 in the lifting ram 6 and the position of the transverse bore 11 in the bushing 8 will be so selected that the lifting ram 6 can be raised to an active position, in which a vacuum is applied to the suction cup 4 from the vacuum chamber 7, whereas the vacuum cup will be exposed to atmospheric pressure when the lifting ram 6 has been lowered to an inactive lower position, in which the port bore 10 is disposed outside of the vacuum chamber 7.

As is indicated by dash lines in FIG. 2, transverse bore 11 of bushing 8 may open into an annular groove 12 formed in the inside surface of the bushing 8. That annular groove 12 defines an elevation range, within which the active position of the associated suction cup 4 can be selected while an application of the vacuum is ensured. In that case the elevations of the suction cups can be adjusted in adaptation to a curved bottom surface of a workpiece. An excessive loss of the vacuum at a suction cup which does not engage the workpiece can be prevented if the cross-sections of the bores and lines are rather small or said bores and lines are formed with constrictions so that the application of a sufficient vacuum and a satisfactory operation will be ensured, provided that a sufficiently powerful vacuum pump is used.

As a separate vacuum chamber or a separate vacuum line is not required for each vacuum aspirator 3, a common vacuum chamber 7 is provided for the aspirators of each row thereof. Said vacuum chambers are defined by chamber structures, which are mounted in the frame of the deck and also serve as carriers. The vacuum chamber structures are joined at their ends to longitudinal side bars 13 of the frame of the deck and said side bars 13 contain vacuum lines, by which the vacuum source, not shown, is connected to the vacuum chambers 7.

As can be seen in FIG. 1, the supporting surface 2 of the work-supporting deck 1 is suitably divided into, e.g., two sections 2a, 2b and the aspirators 3 of each of said sections 2a and 2b are adapted to be connected to a common vacuum source. In that case a vacuum can be applied to the aspirators of one section independently of the aspirators of the other section so that one section can be used to retain workpieces as they are processed whereas workpieces can be placed on or removed from the other idle section at the same time.

To permit an adaptation of the work-supporting surface 2 to different workpieces, it will be desirable to provide at least in one region 2c of the supporting surface 2 a group of aspirators 3 having a different pitch, preferably a smaller pitch, so that particularly smaller workpieces can reliably be supported in that region.

To permit an adjustment of the aspirators 3 in adaptation to workpieces having different shapes and sizes, the aspirators or their suction cups may be laterally adjustable, e.g., by a lateral adjustment of the vacuum chamber structures defining the vacuum chambers 7 if they are slidably mounted on the side bars 13 by carriages 14.

Figure 3:
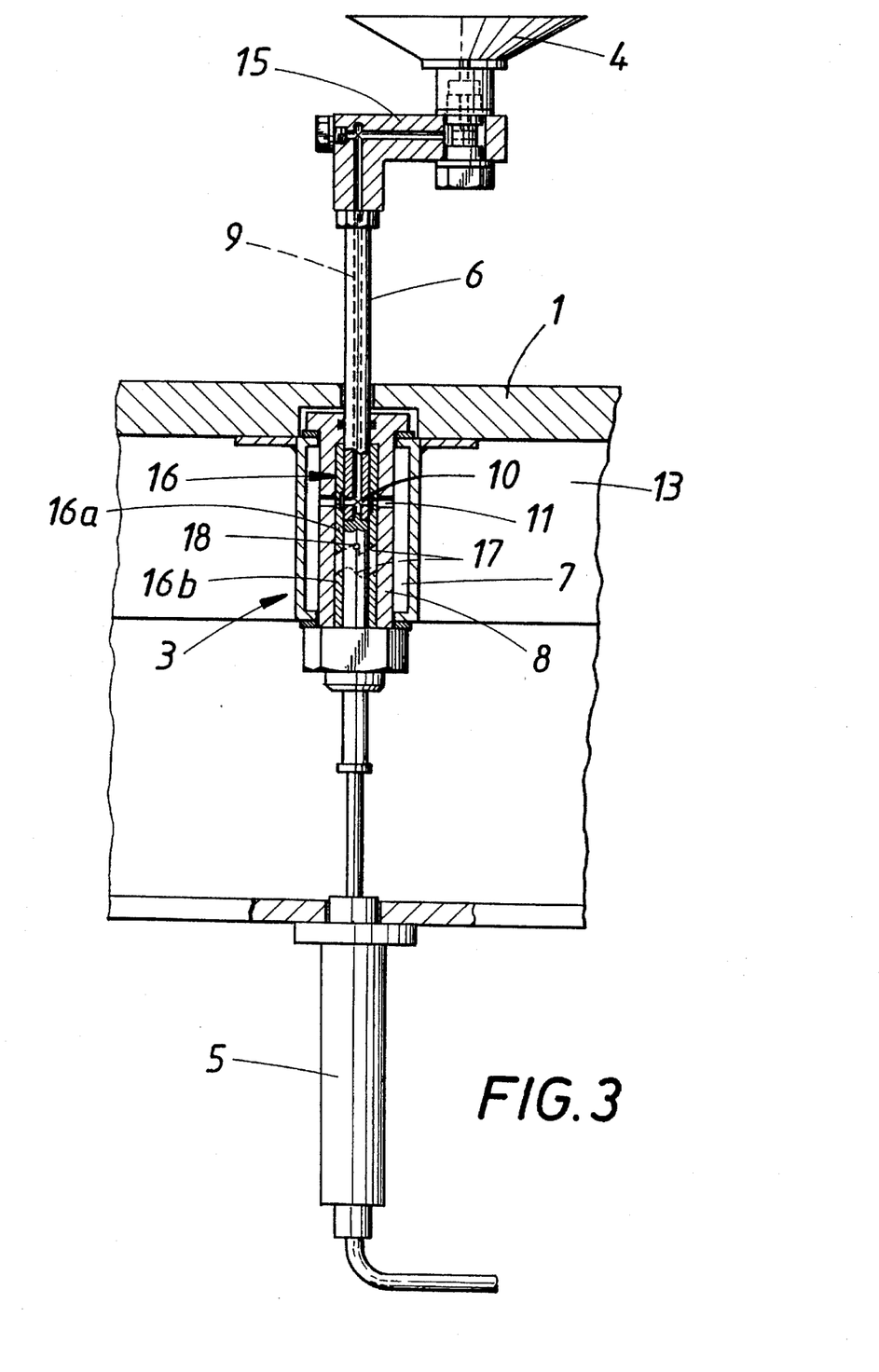
FIG. 3 is a vertical sectional view showing another illustrative embodiment of a vacuum aspirator.

In a particularly desirable arrangement, which may be used for that purpose and is shown in FIG. 3, each vacuum aspirator 3 comprises an eccentrically mounted suction cup 4, which is rotationally adjustable. The suction cup 4 is mounted on an eccentric head 15 of the lifting ram 6, which cooperates with two cam sleeves 16a, 16b, which are generally designated 16 and are fixed in the bushing 8 and have confronting end faces, which constitute cam faces 17 defining a cam slot. The lifting ram 6 is provided with a laterally protruding cam follower pin 18, which extends into said cam slot and cooperates with the cam faces 17 so that the lifting ram 6 will be rotated as it is moved up and down. As a result, the lifting ram 6 can be raised and lowered several times by the actuator 5 so that the lifting ram 6 and the suction cup 4 will be rotated about the axis of the lifting ram 6 to move the suction cup 4 to a desired position on its orbit. Whereas the cam faces 17 may be designed to define different elevations of the lifting ram, such an adjustment in elevation will usually not be desirable unless the suction cup 4 is centered on the lifting ram 6 so that the rotational position and elevation can be selected independently of each other.

Because the actuators 5 for the vacuum aspirators 3 can be individually operated, the work-supporting deck 1 can be adjusted in adaptation to any desired workpiece by a simple program control, which in dependence on the shape and size of the workpiece causes only those aspirators 3 to be activated which are disposed entirely within the contour of the workpiece. As these aspirators 3 are raised, the workpiece is snugly supported on a large area, with the exception of a small margin, which is left free for being processed. That practice will permit a processing with a high quality and a favorable utilization of the tools. Because the raising of the aspirators will automatically move the suction cups to their active positions, in which a vacuum is applied, the workpiece will automatically be supported and retained as the aspirators are raised so that an economical operation will be ensured. Following deactivation of the vacuum, the workpiece can then easily be removed or replaced. Because simple design features will permit different active positions to be assumed by the vacuum cups within a certain elevation range, it will be possible to automatically support even curved or stepped or other shaped workpieces because aspirators disposed near the edges of the workpiece and the inner aspirators can subsequently be raised until they engage the bottom surface of the workpiece and can thus be adapted to the shape of the workpiece.

Figure 4:
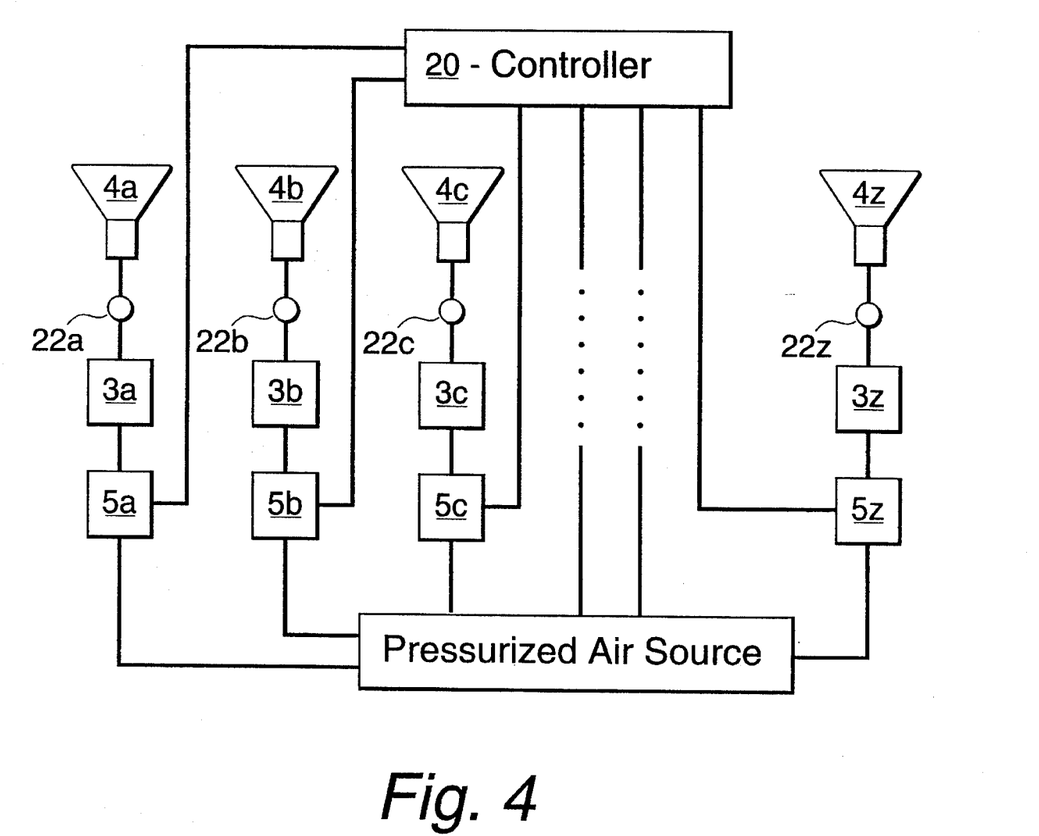
FIG. 4 is a schematic diagram showing a controller connected to the individual actuators.

In order to support the non-flat workpiece, the work-supporting deck includes means for raising at least three suction cups to one of the active upper positions, the uppermost position, for example, to support the workpiece and subsequently raising additional suction cups into contact with the workpiece. The additional suction cups are raised in at least two groups, so that the additional suction cups are coupled with the vacuum source in stages to maintain a predetermined vacuum level. By raising the suction cups in stages, the danger of a sudden collapse of the vacuum is avoided. The suction cups are raised by a controller 20 that is coupled to the actuators, as can be seen in FIG. 4.

Figure 5A:
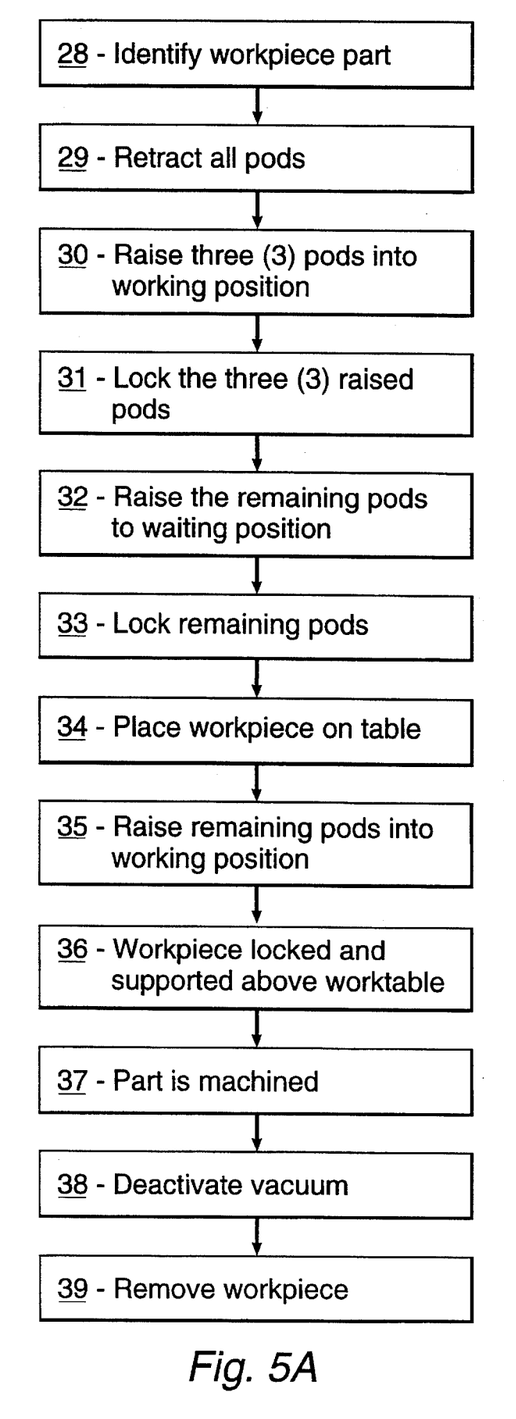
FIGS. 5A and 5B are flow charts representing two basic sequences of operations for the work-supporting deck.
Figure 5B:
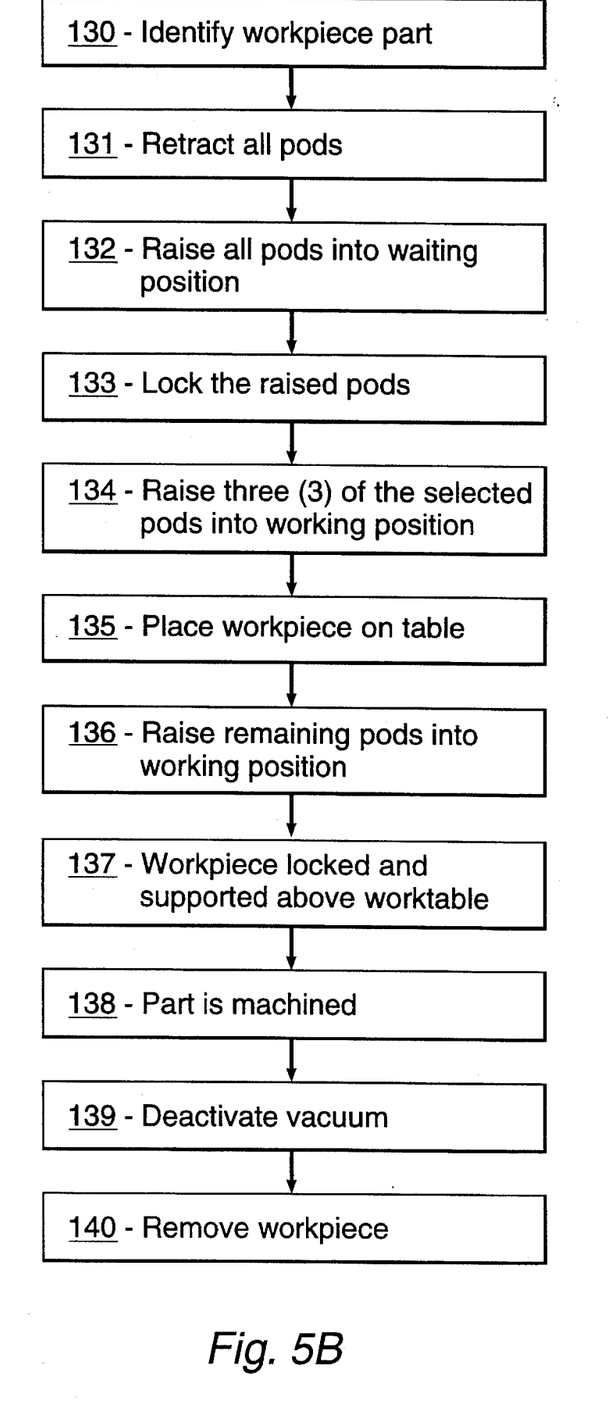

Vacuum cups 4 are made from an elastic material and/or are connected to lifting ram 6 with a universal joint 22 so that vacuum cup 4 can conform to the workpiece surface regardless of its shape. The controller selects at least three suction cups and the additional suction cups as those being wholly within the perimeter of the workpiece. A method for supporting a workpiece with vertically-movable suction cups for machining includes the steps of raising three suction cups to their uppermost position and locking them in place. The workpiece is then placed on the three raised suction cups and additional suction cups that are below the workpiece are raised until they contact the workpiece. The workpiece is machined, the vacuum is deactivated, and the workpiece is removed. FIGS. 5A and 5B are flow charts showing these basic steps 28–39 and 130–140, respectively.

Figures 6, 7:
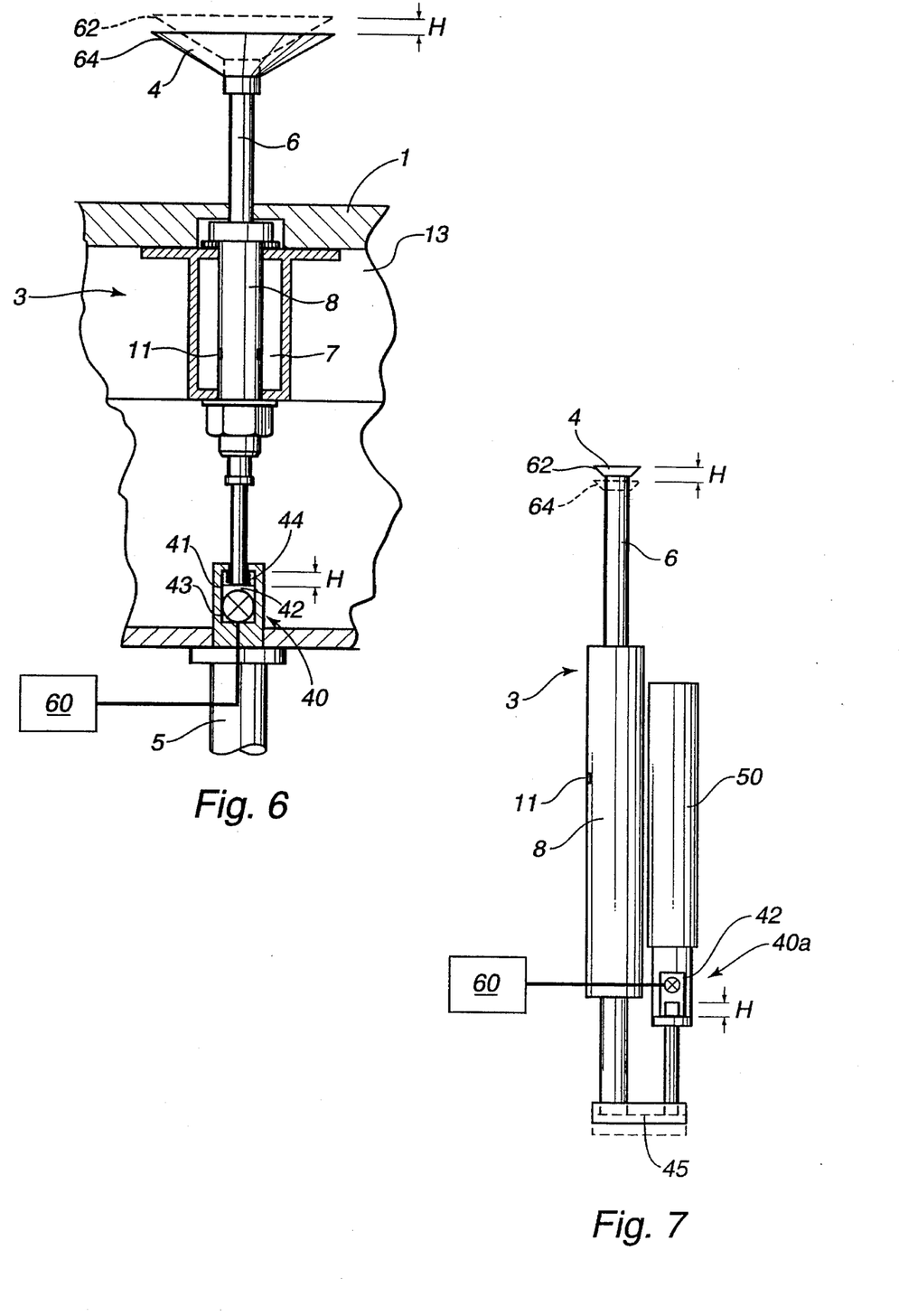
FIG. 6 is a side-elevational view, in part cross-section, of an actuator equipped with a clamping device.
FIG. 7 is a side-elevational view of an actuator equipped with an alternate embodiment of a clamping device.

As can be seen in FIG. 6, each vacuum aspirator 3 is provided with a clamping device 40 which engages the lifting ram 6 and consists of a sliding block 42 with a schematically shown clamping jaw 43. Sliding block 42 is movable back and forth in a vertical guide 41. A return spring 44 retains the sliding block 42 at the bottom final point of the displacement path H determined by vertical guide 41. When pressure is admitted to clamping jaw 43 by an actuating device 60, the jaw clamps lifting ram 6 to sliding block 42, so that when actuator 5 operates sliding block 42 and lifting ram 6 are raised together by exactly the displacement path H and fixed at the top final point of said path of displacement. Actuating device 60 may be associated with actuator 5 or may be a separate unit.

FIG. 5A shows, for chucking a workpiece, the part is identified in step 28 and all pads are retracted in step 29 and three selected vacuum aspirators 3, suitable for supporting the workpiece in points, are raised in step 30 into their working positions 62 and fixed in step 31, which working positions activates the aspirators. The remaining vacuum aspirators present within the zone of support of the workpiece to be worked are vertically adjusted in step 32 into a waiting position 64 in accordance with the surface shape of the workpiece, in which waiting position said aspirators are disposed beneath the actual working position—in which the workpiece is milled—by exactly the displacement path length H of the sliding block 42. For this purpose, the usual positioning measures are employed, for example such as vertical positioning via a tool spindle that can be controlled accordingly. In said waiting position, the vacuum aspirators are fixed in step 33 by actuation of the clamping device 40, such waiting position 62 being preferably just below the acting zone.

Now, the workpiece to be treated is placed on the three raised vacuum aspirators in step 34, such placement being flawless and adjusted, whereupon the remaining vacuum aspirators 3 are attached in step 35 to the workpiece by actuating the associated cylinder drives 5. With the workpiece locked in step 36, the part is machined in step 37. In this connection, the lifting rams 6 are capable of lifting by exactly the displacement path H of the clamping devices 40 and in this way move the vacuum aspirators into their exact working positions. Here, the suction cups 4 attach themselves to the surface of the workpiece without contact pressure and assume their chucking function, whereby nestling of the suction cups against the workpiece is made possible by an articulated support, for example universal joint 22 shown in FIG. 4, or by an elastic design of the suction cups 4. Thereafter, the vacuum is deactivated in step 38 and the workpiece is removed in step 39.

Alternately, as shown in FIG. 5B, the workpiece part is identified in step 130 and all pods are retracted in step 131. All the pods which will be used to support the workpiece are raised into the waiting position in step 132 and locked in step 133. Three of the selected pods are raised into the working position of step 134 following which the workpiece is placed on the table in step 135. Then the remaining pods are raised into the working position in step 136 and the workpiece is locked and supported above the work table in step 137. The part is machined in step 138. Thereafter, the vacuum is deactivated in step 139 and the workpiece is removed in step 140.

FIG. 7 shows an alternate embodiment of the clamping device. A piston-cylinder unit 50 is arranged parallel to bushing 8 of lifting ram 6 in order to reduce the overall height of the device. Aspirator 3 is shown in its raised position 62 with sliding block 42 of clamping device 40a in its uppermost position. A transverse element 45 connects piston-cylinder unit 50 to lifting ram 6 so that movement of piston-cylinder unit 50 or clamping device 40a is directly transferred to lifting ram 6.

Figure 9:
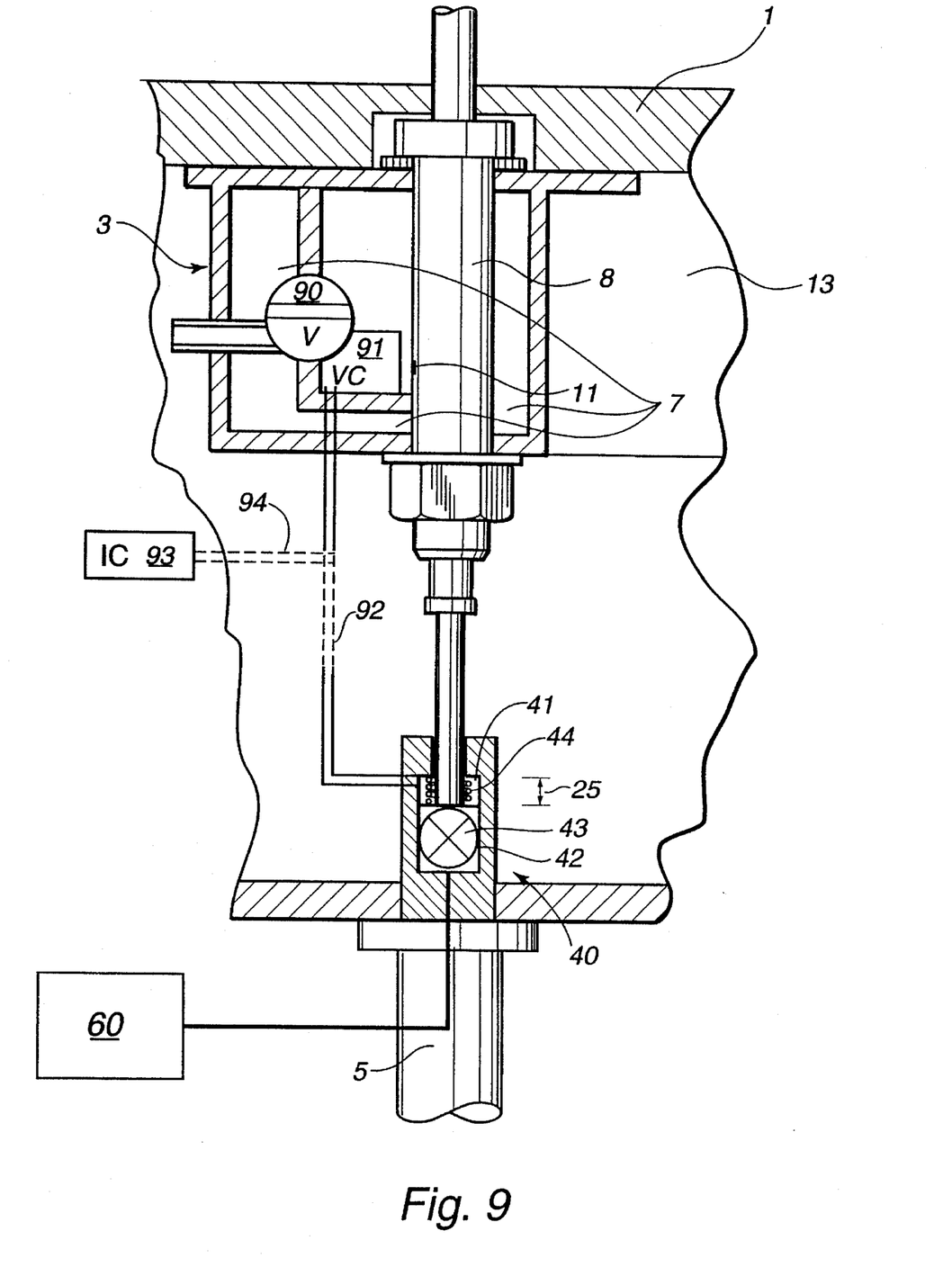
FIG. 9 is an enlarged side elevation view of an electrically operated vacuum source valve.

As can be seen in FIG. 8, a vacuum source valve 80 is disposed within vacuum chamber 7 and coupled to a single transverse bore 11. Vacuum source valve 80 is opened by moving valve stem 82 upwardly a distance 25 where the reduced diameter section 83 of valve stem 82 is aligned with the valve opening. A valve plate 84 coupled valve stem 82 to sliding block 42. Sliding block 42 is also adapted to move upwardly a distance 25 within vertical guide 41. As a result, the vacuum aspirator 3 can be moved to any height, i.e. the waiting position, without being coupled to the vacuum source. Only after clamping device 40 is activated and sliding block 42 is raised does valve stem 82 permit the vacuum source to be coupled with the corresponding aspirator. Alternatively, vacuum source valve 80 is an electrically operated valve 90 controlled by a valve controller 91, as can be seen in FIG. 9. Clamping device 40 includes a relay or switch to open or close valve 90 via lines 92. This system is the functional equivalent of that shown in FIG. 8. For example, when clamping device 40 reaches the top of its displacement path, it closes a contact which opens the electrically-controlled valve to connect the aspirator to the vacuum source. Clamping device 40 can be released and slid downwardly to disconnect the corresponding vacuum aspirator from the vacuum source, for example, to lower individual aspirators for drilling or machining the workpiece above that actuator.

After shutting off actuator 5, actuator 60 releases clamping jaw 43 allowing return spring 44 to move sliding block 42 to its lowered position, thereby isolating the aspirator from the vacuum source. The aspirator is then ventilated to release the suction attaching it to the workpiece. The aspirator can then be retracted without deforming the workpiece. Alternatively, an independent controller 93 opens and closes valve 90 via lines 94 independent of the position of clamping device 40.

While several embodiments of the present invention have been shown and described, it is to be understood that many changes and modifications may be made thereunto without departing from the spirit and scope of the invention as defined in the appended claims.

What is claimed is:

1. A method of supporting and retaining a workpiece on a work-supporting deck for machining, the method comprises the steps of:

selecting a group of vacuum aspirators to serve as an initial workpiece support;

raising the group of vacuum aspirators into a working position;

raising additional vacuum aspirators into a waiting position that is below the working position;

clamping a clamping device onto each of said additional vacuum aspirators, said clamping devices being slidingly disposed in a displacement path having a length equal to the difference between said working position and said waiting position;

placing the workpiece onto the group of aspirators;

raising the additional vacuum aspirators into the working position by sliding the corresponding clamping devices along the length of said displacement path;

machining the workpiece; and removing the workpiece from the work-supporting deck.

2. The method according to claim 1, wherein the vacuum aspirators are connected to a vacuum source as they are raised into the waiting position.

3. The method according to claim 2, wherein the additional aspirators are raised into the waiting position in stages.

4. The method according to claim 1, wherein the vacuum aspirators are connected to a vacuum source as they are raised into the working position.

5. The method according to claim 4, wherein the additional vacuum aspirators are raised into the working position in stages.

6. The method according to claim 5, wherein said step of machining the workpiece comprises:

releasing one of the clamping devices;

sliding the released clamping device back along the displacement path to disconnect the corresponding vacuum aspirator from the vacuum source;

lowering the corresponding vacuum aspirator, and machining the workpiece above the corresponding vacuum aspirator.

7. The method according to claim 1, wherein the vacuum aspirators are independently connectable to a vacuum source.

8. A method of supporting and retaining a workpiece on a work-supporting deck for machining, the method comprises the steps of:

raising selected vacuum aspirators into a waiting position;

clamping a clamping device onto each of said vacuum aspirators;

selecting a group of vacuum aspirators to serve as an initial workpiece support;

raising the group of vacuum aspirators into a working position by sliding said clamping devices along a displacement path, the displacement path having a length equal to the difference between the working position and the waiting position;

placing the workpiece onto the group of aspirators;

raising the remaining selected vacuum aspirators into the working position by sliding the corresponding clamping devices along the length of the displacement path;

machining the workpiece; and removing the workpiece from the work-supporting deck.

9. The method according to claim 8, wherein the vacuum aspirators are connected to a vacuum source as they are raised into the waiting position.

10. The method according to claim 9, wherein the remaining selected vacuum aspirators are raised into the waiting position in stages.

11. The method according to claim 8, wherein the vacuum aspirators are connected to a vacuum source as they are raised into the working position.

12. The method according to claim 11, wherein the remaining selected vacuum aspirators are raised into the working position in stages.

13. The method according to claim 12, wherein said step of machining the workpiece comprises:

releasing one of the clamping devices;

sliding the released clamping device back along the displacement path to disconnect the corresponding vacuum aspirator from the vacuum source;

lowering the corresponding vacuum aspirator; and machining the workpiece above the corresponding vacuum aspirator.

14. The method according to claim 8, wherein the vacuum aspirators are independently connectable to a vacuum source.

15. A method for lowering an individual vacuum aspirator supporting a workpiece on a work-supporting deck for machining, the vacuum aspirator having an associated clamping device slidable within a displacement path, the method comprising the steps of:

releasing the clamping device of the individual vacuum aspirator;

sliding the released clamping device along the displacement path to disconnect the individual vacuum aspirator from a vacuum source;

lowering the individual vacuum aspirator; and machining the workpiece above the individual vacuum aspirator.

\* \* \* \* \*